United States Patent [19]

Walker

[11] Patent Number: 4,666,031
[45] Date of Patent: May 19, 1987

[54] WORKPIECE FEEDING AND CONVEYING SYSTEM

[75] Inventor: Clifford R. Walker, Secane, Pa.

[73] Assignee: Gulf & Western Manufacturing Company, Southfield, Mich.

[21] Appl. No.: 680,135

[22] Filed: Dec. 10, 1984

[51] Int. Cl.$^4$ ............................................. B65G 47/84
[52] U.S. Cl. .................................. 198/450; 198/478.1
[58] Field of Search ............... 198/346.2, 478.1, 612, 198/474.1, 475.1, 476.1, 608, 450; 89/33.1, 33.16; 86/48

[56] References Cited

U.S. PATENT DOCUMENTS

| | | |
|---|---|---|
| 2,358,315 | 9/1944 | Campbell . |
| 2,597,900 | 5/1952 | Paynter et al. . |
| 2,818,964 | 1/1958 | Picard et al. . |
| 2,935,914 | 5/1960 | Darsie et al. ....................... 89/33.02 |
| 2,971,438 | 2/1961 | Fox ................................. 198/478.1 X |
| 2,993,415 | 7/1961 | Panicci et al. .................. 89/33.02 X |
| 3,075,434 | 1/1963 | Hickman et al. ............. 198/478.1 X |
| 3,164,243 | 1/1965 | Rudszinat et al. . |
| 3,166,963 | 1/1965 | Brown . |
| 3,380,627 | 4/1968 | Aidlin . |
| 3,601,242 | 8/1971 | Reinemuth ..................... 198/612 X |
| 3,845,851 | 11/1974 | Decker et al. . |
| 3,978,968 | 9/1976 | Rose et al. ...................... 198/608 X |

Primary Examiner—Robert J. Spar
Assistant Examiner—Lyle Kimms
Attorney, Agent, or Firm—Body, Vickers & Daniels

[57] ABSTRACT

A workpiece feeding and conveying system is disclosed which is comprised of a plurality of stationary workpiece supply stations radially spaced from and circumferentially spaced apart relative to a central axis. A plurality of pocketed workpiece transfer plates are supported radially outwardly of the feed stations for rotation about the central axis and about corresponding axes of rotation, and an annular carrier ring radially outward surrounds the transfer plates and is rotatable about the central axis relative to the supply stations and transfer plates. The transfer plates have radially outwardly opening pockets, and the carrier ring has radially inwardly opening pockets, and a planetary gear arrangement is provided for rotating the transfer plates about their axes of rotation and about the central axis in response to rotation of the carrier ring. During such rotation the pockets of the transfer plates pick up workpieces from the supply stations and accelerate the workpieces to a velocity corresponding to that of the carrier ring for deposit of the workpieces in the pockets thereof.

25 Claims, 12 Drawing Figures

FIG. 7
FIG. 8
FIG. 9

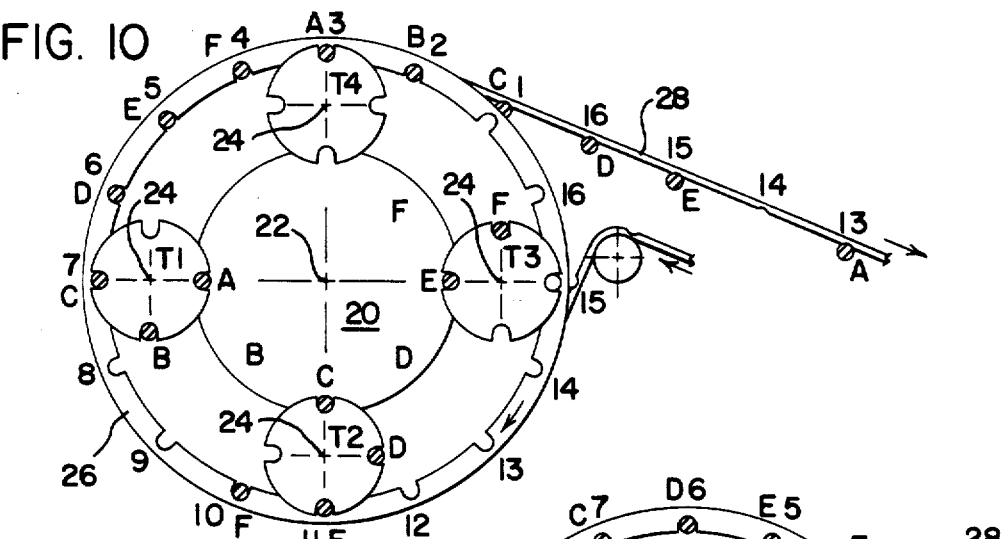
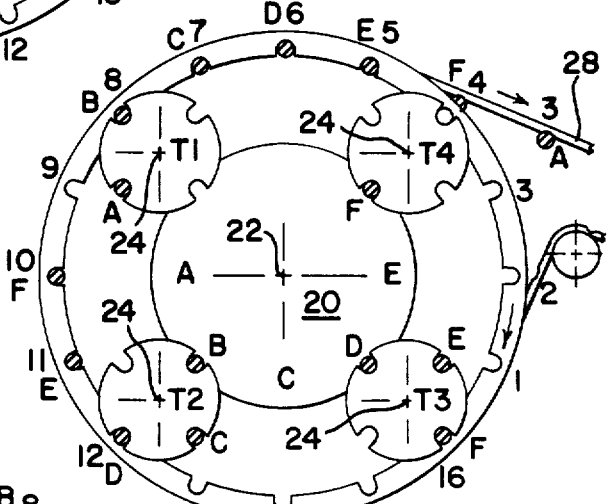
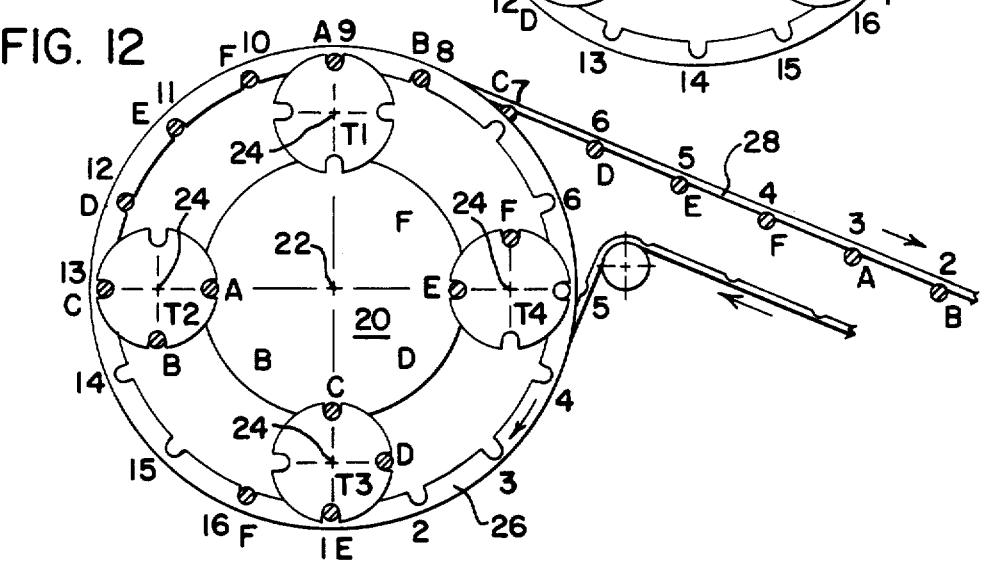

WORKPIECE FEEDING AND CONVEYING SYSTEM

BACKGROUND OF THE INVENTION

This invention relates to the art of article handling and, more particularly, to apparatus for transferring articles from a fixed supply station to a moving carrier at a velocity corresponding to that of the carrier.

The present invention finds particular utility in connection with the production line transfer and assembly of penetrators and lead slugs which, when assembled, provide bullets for subsequent assembly with cartridge casings, and the invention will be described hereinafter in connection with such use. At the same time, however, it will be understood that the invention is applicable to the transfer of workpieces or articles other than component parts of bullets and to the transfer of articles or workpieces for purposes other than assembly operations.

In connection with the manufacturing of bullets, workpieces in the form of hollow metal penetrators and correspondingly shaped lead slugs are sequentially fed to a carrier in which the penetrator and slug are supported in axial alignment with one another. The carrier conveys the positioned parts to an insert press by which the slug is introduced into the penetrator. High production rates are required in connection with the manufacture of bullets and, accordingly, high rates of the feeding of the component parts from a supply point to the carrier is also required. Heretofore, either the production rate has been limited, or damage or potential damage to the workpieces has been undesirably high, as a result of impact loading on the workpieces at the supply station and/or the point of discharge to the carrier. The impact loading is caused by a velocity mismatch between the workpieces and the transfer mechanism which engages the workpieces at the supply station and displaces the workpieces to a point at which they are discharged to the carrier. Impact loading is also caused by a velocity mismatch between the transfer mechanism and the carrier. It will be appreciated, of course, that a higher speed of operation of the transfer mechanism in an effort to increase production rate results in an increase in the damage or potential damage to the workpieces by increasing the impact loading thereon, and that efforts to minimize damage to the workpieces by reducing the speed of the transfer mechanism results in a lower production rate.

SUMMARY OF THE INVENTION

The present invention advantageously provides workpiece feeding and conveying apparatus which enables the transfer of workpieces from a supply station to a carrier without the impact loading encountered in connection with the use of apparatus heretofore available. Accordingly, the present invention advantageously enables a high parts per minute transfer of workpieces while, at the same time, eliminating or minimizing the workpiece damage which heretofore accompanied a correspondingly high transfer rate.

More particularly in accordance with the present invention, the workpiece conveying apparatus utilizes the principle of planetary gearing to provide matched velocities between the workpiece and transfer device at the supply station and between the transfer device and carrier at the point of discharge of the workpiece to the carrier. It is of course known that the teeth of a planet gear orbiting about a sun gear travel along an involute curve or path and, at the gear teeth contact points with the sun gear and ring gear, the velocities of the planet gear teeth are matched with those of the sun and ring gear. Accordingly, with a fixed sun gear, a given tooth of the planet gear has zero velocity at its contact point with the sun gear and has a velocity matched with that of the ring gear at its point of contact therewith and which is predetermined by the speed of rotation of the ring gear. Apparatus according to the present invention provides workpiece pick up and discharge points corresponding to and respectively coincident with the points of contact of a given tooth of a pinion gear with the sun and ring gears. Therefore, the workpiece transfer device of apparatus according to the present invention, which corresponds to the planet gear, has a zero velocity match with a workpiece at the point of pick up thereof and, at the point of transfer of the workpiece to the carrier has a velocity matched with that of the latter. Accordingly, transfer of the workpiece is achieved without impact loading thereon.

It is an outstanding object of the present invention to provide improved article conveying apparatus of the type operable to transfer a workpiece from a rest position at a supply station to a point of discharge of the workpiece to a moving workpiece carrier.

Another object is the provision of apparatus of the foregoing character which is operable to pick up and discharge a workpiece with minimal or no impact loading thereon.

A further object is the provision of apparatus of the foregoing character which includes a transfer device rotatably displaceable relative to the supply station and workpiece carrier in a manner which provides matched velocities between the transfer device and workpiece at the supply station and between the transfer device and carrier at the point of discharge of the workpiece to the carrier.

Still another object is the provision of apparatus of the foregoing character wherein the supply station, transfer device and workpiece carrier respectively correspond to sun, planet and ring gears of a planetary gear arrangement and wherein the component parts of the apparatus are coordinated for the transfer device to pick up a workpiece at rest from a supply station and to accelerate the workpiece to a velocity corresponding to that of the workpiece carrier at the point of discharge of the workpiece to the carrier.

Yet another object is the provision of workpiece conveying apparatus of the foregoing character which enables a high parts per minute rate of workpiece transfer in a minimum amount of space and which apparatus is highly efficient in operation while minimizing damage to workpieces and loss of workpieces through excessive damage.

BRIEF DESCRIPTION OF THE DRAWINGS

The foregoing objects, and others, will in part be obvious and in part pointed out more fully hereinafter in conjunction with the written description of a preferred embodiment illustrated in the accompanying drawings in which.

DESCRIPTION OF THE PREFERRED EMBODIMENT

Figure 1:
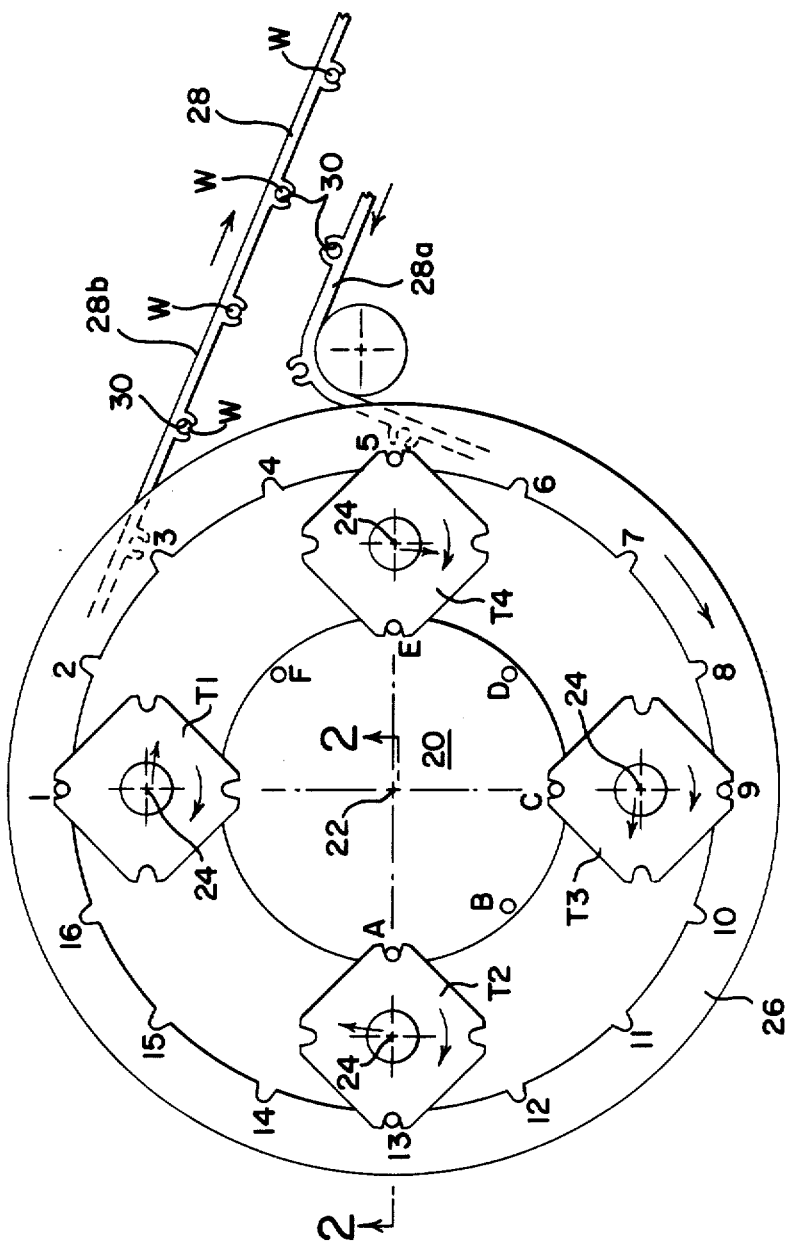
FIG. 1 is a somewhat schematic plan view illustrating the arrangement and operational interrelationship between supply, transfer and carrier components of conveying apparatus according to the present invention.

With reference now in greater detail to the drawings wherein the showings are for the purpose of illustrating a preferred embodiment of the invention and not for limiting the invention, FIG. 1 somewhat schematically illustrates the major component parts of workpiece conveying apparatus according to the invention. More particularly in this respect, the apparatus includes a fixed central portion 20 having a vertical axis 22 and a plurality of workpiece supply stations A–F radially spaced from axis 22 and circumferentially spaced apart relative to one another. A plurality of workpiece transfer plates T1–T4 are equally spaced apart about central portion 20 and, as will be more fully described hereinafter, plates T1–T4 are supported for rotation as a unit about axis 22 and for rotation individually about corresponding axes 24. An annular workpiece carrier ring 26 extends about the transfer plates and is concentric with and supported for rotation about axis 22. In the embodiment illustrated, each of the transfer plates is provided with four outwardly opening pockets, not designated numerically, in diametrically opposed pairs relative to the corresponding axis 24, and carrier ring 26 is provided with inwardly opening pockets 1–16 equally spaced apart circumferentially thereabout. As will become more apparent hereinafter, central portion 20, transfer plates T1–T4 and carrier ring 26 respectively correspond to sun, planet and ring gears of a planetary gear arrangement. Further, the pockets of transfer plates T1–T4, the positioning and spacing of supply stations A–F, and the pockets of carrier ring 26 are structurally interrelated such that workpieces are sequentially picked-up by the pockets of the transfer plates from the supply stations and are transferred by the transfer plates along an involute curve path and discharged into the pockets of carrier ring 26. Accordingly, at the point of pick up of a workpiece by the pocket of a transfer plate the stationary workpiece and transfer plate pocket are at zero velocity, and at the point of discharge of the workpiece from the transfer plate pocket to the carrier ring pocket the workpiece is moving at the same velocity as the carrier ring pocket, whereby both the pick up and discharge operations are achieved without impact loading on the workpiece.

In connection with the production of bullets by the joining of penetrators and slugs, two apparatus corresponding to that described above and shown in FIG. 1 would be operatively connected in series by means of a workpiece transport device such as the flexible belt 28 shown in FIG. 1 and which has a plurality of workpiece receiving pockets 30 spaced apart therealong a distance corresponding to the circumferential spacing between adjacent ones of the pockets 1–16 of carrier ring 26. As will be more fully appreciated hereinafter, transport belt 28 is trained about the apparatus beneath carrier ring 26 so that pockets 30 of belt 28 are aligned with and beneath the pockets of the carrier ring, and workpieces transferred from the supply stations to the pockets of the carrier ring are displaced downwardly into the underlying pocket 30 of the transport belt shortly after discharge of the workpiece into the carrier ring pocket. Positioning of penetrators and slugs for subsequent joining to form a bullet requires the sequential positioning of a penetrator and slug in a given pocket 30 of belt 28 for the slug to be above and aligned with the penetrator for displacement thereinto in a suitable joining press. If the apparatus illustrated in FIG. 1 is considered to be the first of two such apparatus for preparing the penetrators and slugs for joining, and it is assumed that carrier ring 26 rotates clockwise in FIG. 1, it will be appreciated that pockets 30 of entering portion 28a of transport belt 28 are empty and that the pockets of exiting portion 28b of the belt contain the workpieces W or penetrators which have been transferred from the supply stations to the carrier ring and thence to the transport belt. Portion 28b of belt 28 would then provide the entrance portion of the belt for the second apparatus and which entrance portion would correspond to portion 28a of the belt shown in FIG. 1. Accordingly, the second apparatus would operate to transfer lead slugs from the supply stations to the corresponding carrier ring pockets and thence downwardly into pockets 30 of the transport belt above and in alignment with the penetrators therein. The exit portion of the second apparatus would then move through a suitable joining press to achieve joining of the associated penetrators and slugs.

Figure 2:
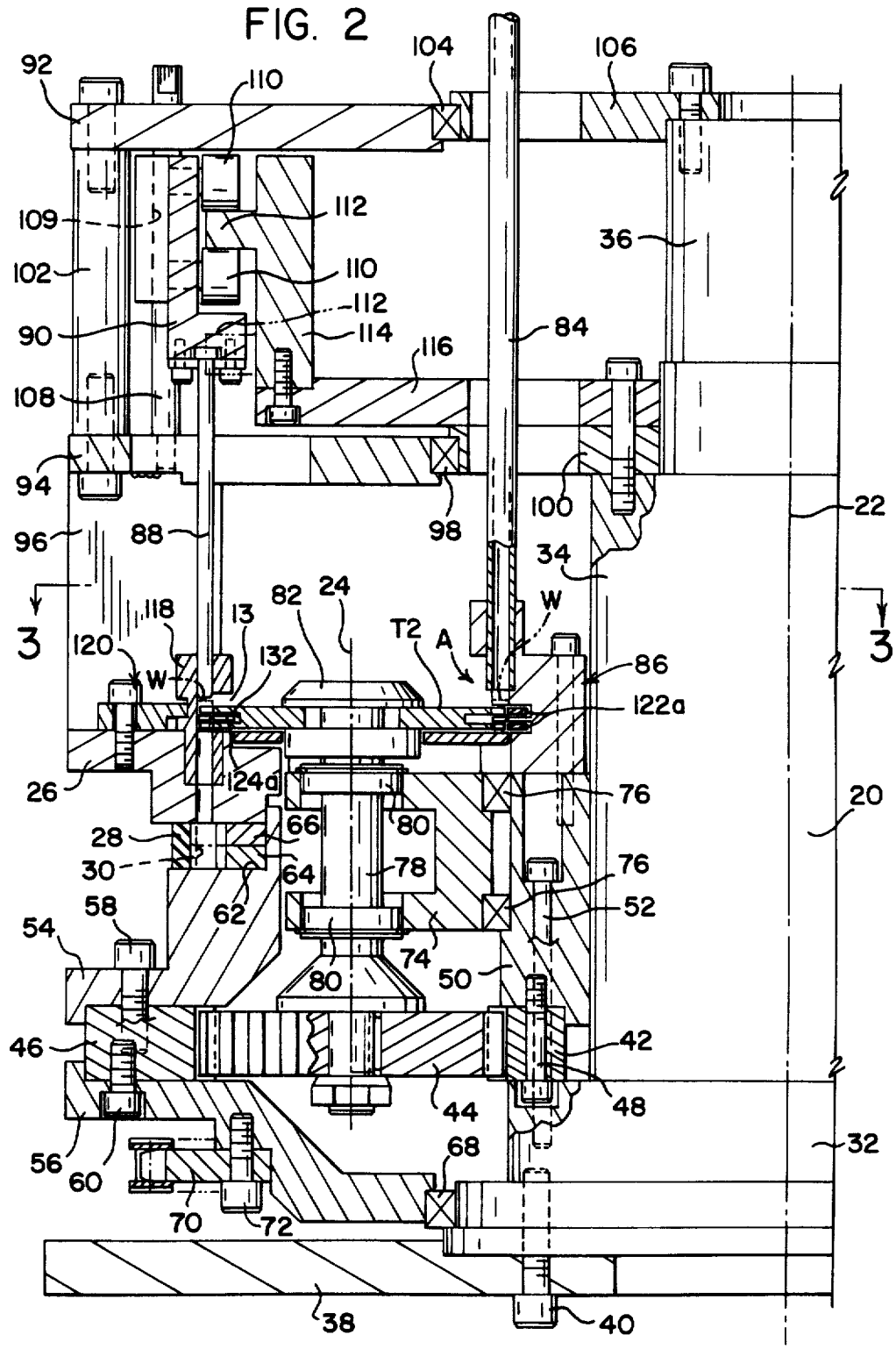
FIG. 2 is a sectional elevation view of a portion of a structural embodiment of the apparatus as would be seen looking in the direction of line 2—2 in FIG. 1 of the drawing.
Figure 3:
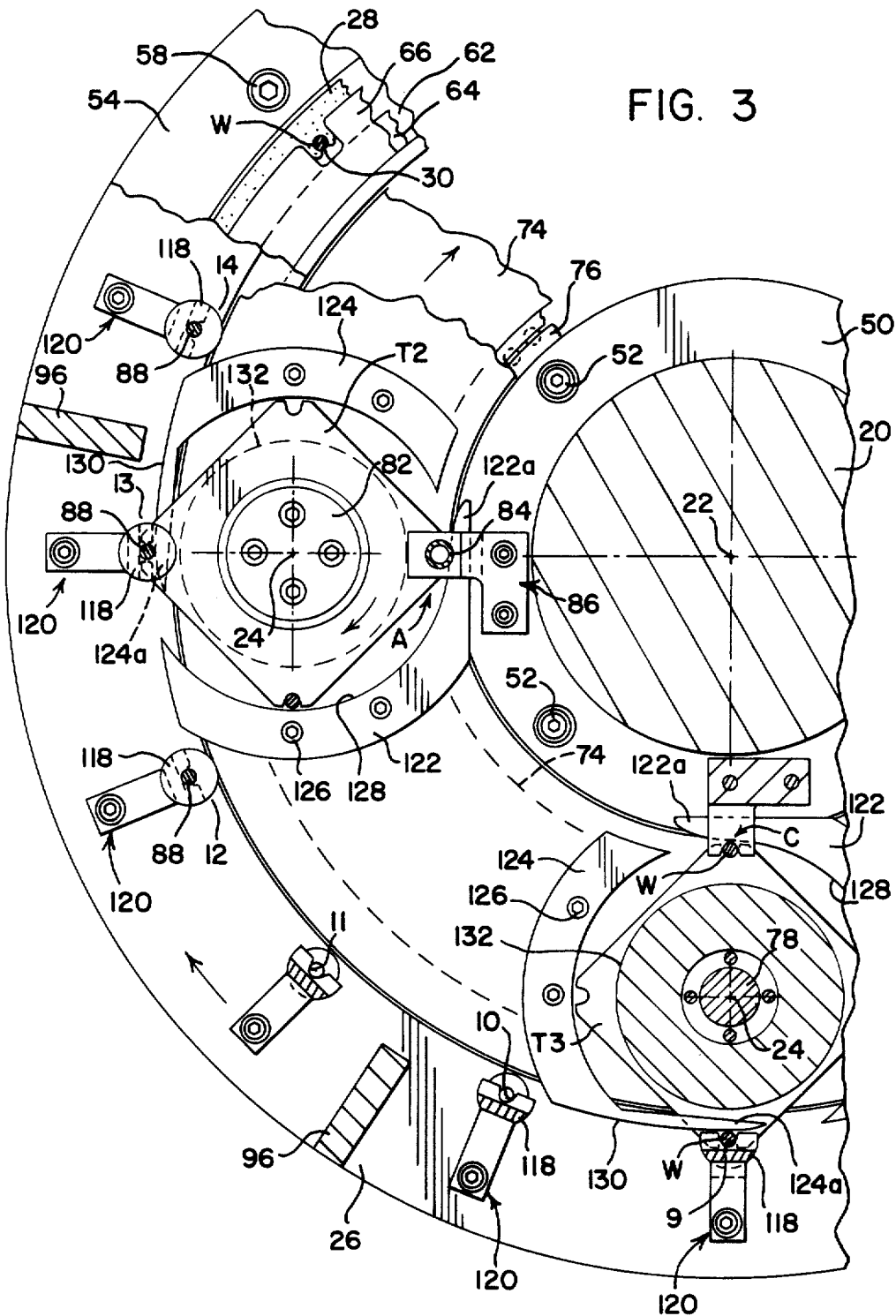
FIG. 3 is a plan view of the supply, transfer and carrier components taken along line 3—3 in FIG. 2; and, FIGS. 4–12 schematically illustrate operation of the apparatus through one complete revolution of the transfer components about the central axis of the apparatus.

FIGS. 2 and 3 of the drawing illustrate a structural embodiment of component parts of apparatus according to the present invention operable to transfer and convey workpieces in the manner described hereinabove. The manner in which workpieces are picked-up at the supply stations, transferred to the carrier ring pockets and then displaced into the transport belt will be appreciated from the foregoing description of FIG. 1 together with the following description of FIGS. 2 and 3. More particularly in this respect, central portion 20 of the apparatus is in the form of an annular column having a base portion 32, a vertically intermediate portion 34 and an upper portion 36, and the column is suitably mounted on a base plate 38 such as by bolts 40. Base portion 32 of the column supports a planetary gear assembly including an annular sun gear member 42, four planet gears 44, only one of which is visible in FIG. 2 and each of which corresponds to a different one of the transfer plates T1–T4, and an annular ring gear 46. Sun gear 42 is mounted by bolts 48 to the underside of a collar 50 which surrounds intermediate portion 34 of the column and which is bolted to base portion 32 by means of a plurality of bolts 52. Ring gear 46 is mounted on the column for rotation about axis 22 by means of upper and lower annular ring plates 54 and 56, respectively, and between which the ring gear is secured by means of bolts 58 and 60.

Upper ring plate 54 extends upwardly to provide a shoulder 62 on which is disposed an annular spacer ring 64, an annular transport belt sprocket 66, and carrier ring 26, all of which components are secured to upper ring plate 54 by bolts, not shown, extending downwardly through openings therefor in components 26, 66 and 64 and into ring plate 54. Lower ring plate 56 is rotatably interengaged with the lower end of base portion 32 of the central column by means of a bearing assembly 68 therebetween, and an annular ring gear drive sprocket 70 is mounted on the underside of ring plate 56 by means of bolts 72 to enable driving of the apparatus as described more fully hereinafter. Planet gears 44 are supported for rotation about their corresponding axes 24 and for rotation about central axis 22 of the apparatus by means of an annular support ring 74 mounted on collar 50 for rotation about axis 22 by means of bearing assemblies 76. Each of the planet gears 44 is keyed to a shaft 78 which extends upwardly through support ring 74, and shaft 78 is supported for rotation relative to support ring 74 and about the corresponding axis 24 by means of bearing assemblies 80. The corresponding transfer plate, T2 in FIG. 2, is secured to the upper end of shaft 78 by means of a plate cap 82. Each of the planet gears is in meshing engagement with sun gear 42 and ring gear 46, whereby it will be appreciated that rotational displacement of ring gear 46 causes each planet gear 44 and thus the corresponding transfer plate to orbit about central axis 22 while rotating about its corresponding axis 24.

As shown with respect to supply station A in FIGS. 2 and 3, each of the supply stations A-F includes a workpiece feed tube 84 suitably supported in a fixed position relative to central portion 20 of the apparatus such as by means of a mounting block assembly 86 secured to collar 50. As mentioned hereinabove, and as will become more apparent hereinafter, a workpiece transferred by a transfer plate from a work station to a pocket of the carrier ring is displaced downwardly from the carrier ring into an underlying pocket 30 of transport belt 28. For this purpose, a punch rod 88 is provided for each of the carrier ring pockets and is mounted on the apparatus for rotation with the carrier ring about central axis 22 and for vertical displacement between upper and lower positions relative to the carrier ring. More particularly in this respect, as will be appreciated from FIG. 2, the upper end of each punch rod 88 is secured to the underside of a corresponding cam follower block 90 which is mounted between upper and lower annular support plates 92 and 94, respectively. Lower support plate 94 is supported relative to carrier ring 26 by means of a plurality of radially extending support plates 96 therebetween and spaced apart circumferentially thereabout, and lower support ring 94 is supported for rotation with carrier ring 26 about central axis 22 by means of a bearing unit 98 between the inner periphery of plate 94 and the outer periphery of a bearing support plate 100 mounted on the upper end of intermediate pedestal portion 34. Upper and lower support plates 92 and 94 are vertically spaced apart and interconnected by a plurality of support posts 102 therebetween and upper support plate 92 is supported for rotation about central axis 22 by means of a bearing assembly 104 between the inner periphery of support ring 92 and the outer periphery of an upper bearing plate 106 secured to the upper end of upper pedestal portion 36.

Each of the cam follower blocks 90 and thus the corresponding punch rod 88 is supported for vertical reciprocation relative to support plates 92 and 94 by means of a pair of guide rods 108, only one of which is visible in FIG. 2, suitably secured between plates 92 and 94 and extending through corresponding openings 109 therefor in the cam follower block. Each cam follower block 108 supports a pair of follower rollers 110 which are vertically spaced apart to engage the vertically opposite sides of the cam track portion 112 of an annular cam ring 114. Cam ring 114 is concentric with central axis 22 and is secured to the inner end of intermediate pedestal portion 34 by means of an annular support plate 116, whereby the cam is fixed relative to central axis 22. In the embodiment illustrated, each of the carrier ring pockets is provided by a vertically apertured insert 118 mounted on carrier ring 26 such as by means of a clamping assembly 120. Insert 118 has a lower portion received in carrier ring 26 and an upper portion receiving the lower end of the corresponding push rod 88. An opening intermediate the upper and lower portions and facing radially inwardly toward axis 22 defines the entrance to the corresponding carrier ring pocket which is pocket 13 in FIG. 2. Cam track portion 112 is an annular cam track relative to central axis 22, and the contour of the cam track for each carrier ring pocket varies from an upper position shown in FIG. 2 to a lower position which provides for positioning the lower end of punch rod 88 in the upper end of an underlying pocket 30 of transport belt 28. Positioning of the punch rod 88 as shown in FIG. 2 enables displacement of a workpiece from the transfer plate into the carrier ring pocket and downward displacement of the punch rod then operates to displace the workpiece into the underlying transport belt pocket. As will become apparent hereinafter, the latter transfer is achieved without interference between the punch rod and transfer plate.

It will be appreciated from the foregoing description that the rotation of ring gear 46 by driving sprocket member 70 causes the orbiting of planet gears 44 and thus the corresponding transfer plates about central axis 22, and causes the rotation of each planet gear and the corresponding transfer plate about its axis 24. It will be further appreciated that carrier ring 26 and punch rods 88 rotate with ring gear 46 about central axis 22 and that each of the workpiece supply stations is stationary relative to axis 22. During such relative movement between the component parts, diametrically opposed pairs of pockets in the transfer plates periodically become aligned with a supply station and a pocket in the carrier ring, as shown in FIG. 3 with respect to opposed pockets of transfer plates T2 and T3 relative respectively to supply stations A and C and carrier ring pockets 13 and 9. With reference to transfer plate T2 in FIGS. 2 and 3, and presuming that ring gear 46 is rotating clockwise in FIG. 3, it will be appreciated that planet gear 44 and thus transfer plate T2 orbit about central axis 22 in the clockwise direction and that the planet gear and thus transfer plate T2 rotate clockwise about the corresponding axis 24. When the radially inner and outer pockets of transfer plate T2 are in the positions shown in FIG. 3 the velocities of the pockets in the transfer plate are matched with the velocities of the work station and carrier ring pocket which, respectively, are zero and a velocity determined by the speed of rotation of the carrier ring. At this point, displacement of a workpiece from tube 84 at supply station A into the radially inner pocket of transfer plate T2 is completed as is the discharge of the workpiece in the radially outer pocket of the transfer plate into pocket 13 of the carrier ring. To facilitate the latter workpiece displacements, transfer plate support ring 74 is provided with a pair of fixed arcuate guide segments 122 and 124 for each transfer plate and on circumferentially opposite sides of the corresponding transfer plate axis 24. Each of the segments 122 and 124 is secured to member 74 by means of corresponding bolts 126 and thus moves with the corresponding transfer plate in orbit about central axis 22.

As will be appreciated from FIGS. 2 and 3 of the drawing, guide segment 122 has a pair of fingers 122a at the radially inner end thereof and guide segment 124 has a finger 124a at the radially outer end thereof. Further, guide segment 122, including fingers 122a, has an inner guide surface 128, and finger 124a of guide segment 124 has a radially outwardly facing guide surface 130. Fingers 122a move past the supply stations radially behind a workpiece and beneath feed tube 84, and mounting block 86 for the feed tube is provided with a pair of recesses, not designated numerically, through which the fingers 122a move. The pockets of carrier ring 26 move past fingers 124a and guide surface 130 is radially inwardly adjacent the pockets in the carrier ring. As will be further appreciated from FIGS. 2 and 3, when the diametrically opposed pairs of pockets in the transfer plates are positioned to receive a workpiece from a work station and to discharge a workpiece to the carrier ring, the corresponding pockets are vertically aligned with the axis of feed tube 84 and with the pocket in the carrier ring.

Just prior to transfer plate T2 reaching the position shown in FIG. 3, the transfer plate and guide segments are orbiting clockwise about central axis 22, carrier ring 26 is rotating clockwise about axis 22 faster than the orbiting speed, the transfer plate is rotating relative to the guide segments about axis 24, and the transfer plate pocket approaching the supply station is empty. Therefore, as the empty transfer plate pocket approaches the work station, fingers 122a progressively move behind a workpiece beneath feed tube 84, and the transfer from the work station to the transfer plate pocket is completed when the component parts are positioned as shown in FIG. 3. At the same time, the workpiece which is in the transfer plate pocket shown in FIG. 3 in the position of discharge to carrier ring pocket 13 is moving clockwise relative to guide segment 122 and is retained in the transfer plate pocket by guide surface 128 of the guide segment. As the transfer plate pocket approaches alignment with the carrier ring pocket, the workpiece is moved onto guide finger 124a which is then positioned radially behind the workpiece. To facilitate the latter positioning of finger 124a radially behind a workpiece in the transfer plate pocket, and as will be appreciated from FIGS. 2 and 3, the transfer plate is circumferentially recessed intermediate the top and bottom sides thereof as indicated by broken line 132 in FIG. 3. Upon alignment between the transfer plate pocket and carrier ring pocket as shown in FIG. 3, the workpiece is transferred to the carrier ring pocket and, because the carrier ring is rotating about axis 22 faster than support ring 74 and thus guide segment 124, the workpiece moves along surface 130 of finger 124a and is retained in the carrier ring pocket by surface 130. At an appropriate time after displacement of the transfer plate pocket clockwise out of alignment with the carrier ring pocket, cam 112 operates to displace the corresponding punch rod 88 downwardly to displace the workpiece from the carrier ring pocket into the underlying pocket 30 of transport belt 28.

FIGS. 4-12 of the drawings schematically illustrate a sequence of pick up and transfer operations of apparatus according to the present invention and in which the supply stations, transfer plates and carrier ring components are structured and structurally interrelated as described hereinabove in connection with FIGS. 2 and 3 of the drawing. In the embodiment herein illustrated and to be described in connection with FIGS. 4-12, the planet: sun:ring gear ratio is 4:2:1 providing for the transfer plates T1-T4 to rotate 90° about the transfer plate axes ≧ during an orbit of the transfer plates 45° about central axis 22 and in response to rotation of the carrier ring 67.5° about central axis 22. Therefore, one complete orbit or cycle of the transfer plates about central axis 22 requires 540° of rotation of carrier ring 26 about the central axis 22. Supply stations A-F are spaced apart 45° from one another about central axis 22, and pockets 1-16 of carrier ring 26 are spaced apart 22.5° relative to axis 22. As will become apparent from the following description of FIGS. 4-12, workpiece feed and discharge functions take place during each 67.5° of rotation of the carrier ring and the corresponding rotational and orbital displacements of the transfer plates. While the description will be with respect to such incremental displacements, it will be appreciated that the apparatus is continuously driven whereby rotation of the component parts is continuous during operation.

Figure 4:
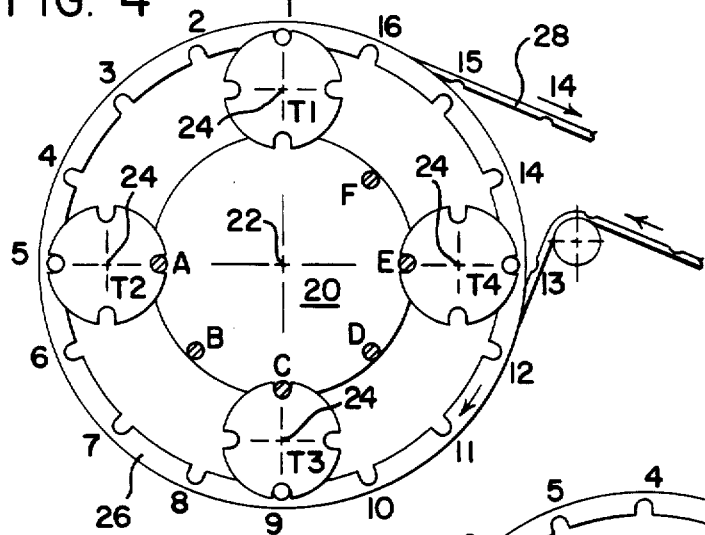
Figure 5:
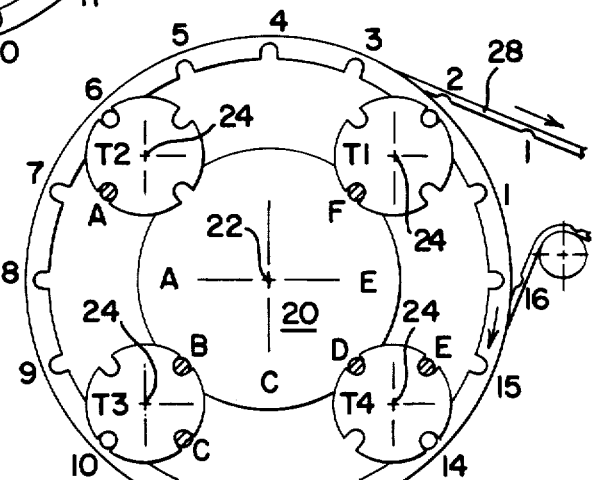
Figure 6:
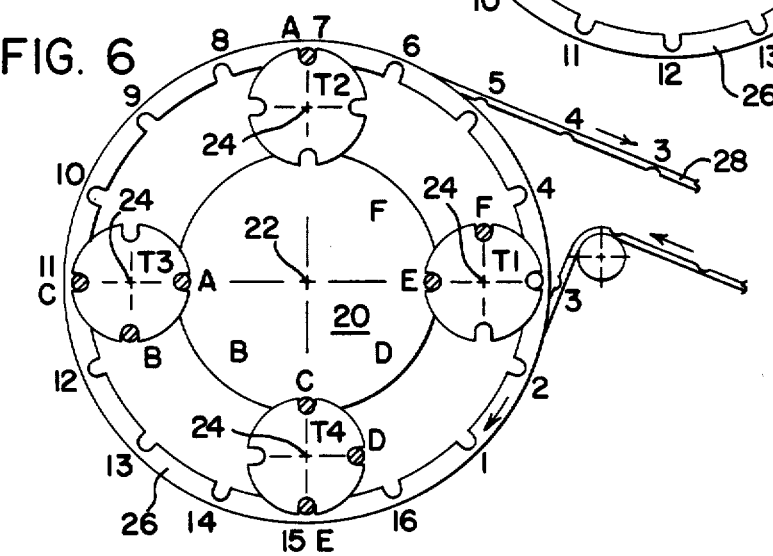

In FIGS. 4-12, the transfer plates are designated T1, T2, T3, T4, the numerals 1-16 represent the sixteen pockets in carrier ring 26. The letters A-F as associated with central portion 20 represent the workpiece supply stations and as associated with the transfer plates and carrier ring pockets represent workpieces picked-up at the corresponding supply station and discharged to the ring pocket. With this in mind, and considering the apparatus to be starting operation with the component parts positioned as shown in FIG. 4, it will be seen from the latter Figure that a pocket of each of the transfer plates T2, T3 and T4 is positioned to receive workpieces from work stations A, C and E, respectively, the other pockets initially being empty. Upon rotation of carrier ring 26 clockwise 67.5° to the position shown in FIG. 5, each of the transfer plates is orbited 45° clockwise about axis 22 and rotated 90° clockwise about its own axis 24, whereby workpieces A, C and E are transferred clockwise toward carrier ring 26, the succeeding pockets in transfer plates T3 and T4 are respectively positioned to pick up workpieces from supply stations B and D, and a pocket of transfer plate T1 is positioned to pick up a workpiece from supply station F. Upon rotation of carrier ring 26 clockwise 67.5° to the position shown in FIG. 6, workpieces A, C and E have been transferred for displacement into carrier ring pockets 7, 11 and 15, respectively, workpiece F has been transferred toward the carrier ring and pockets of transfer plates T3, T4 and T1 are positioned to receive workpieces from supply stations A, C and E respectively. Rotation of carrier ring 26 clockwise 67.5° to the position shown in FIG. 7 positions transfer plates T3, T4 and T1 for the discharge of workpieces B, D and E respectively into carrier ring pockets 12, 16 and 4, positions transfer plates T4, T1 and T2 for pockets thereof to receive workpieces from supply stations B, D and F, respectively, and provides for the workpieces A, C and E in transfer plates T3, T4 and T1 to be in intermediate positions of transfer to the carrier ring. At this time, the pocket in transport belt 28 corresponding to pocket 7 in the carrier ring in FIG. 6 has received workpiece A and is transporting the latter away from the apparatus. Also at this time, the succeeding three pockets of belt 28 which correspond to pockets 8, 9 and 10 of the carrier ring in the preceding Figures are empty in that there has been no transfer of workpieces into these carrier ring pockets.

Figures 7, 8, 9:
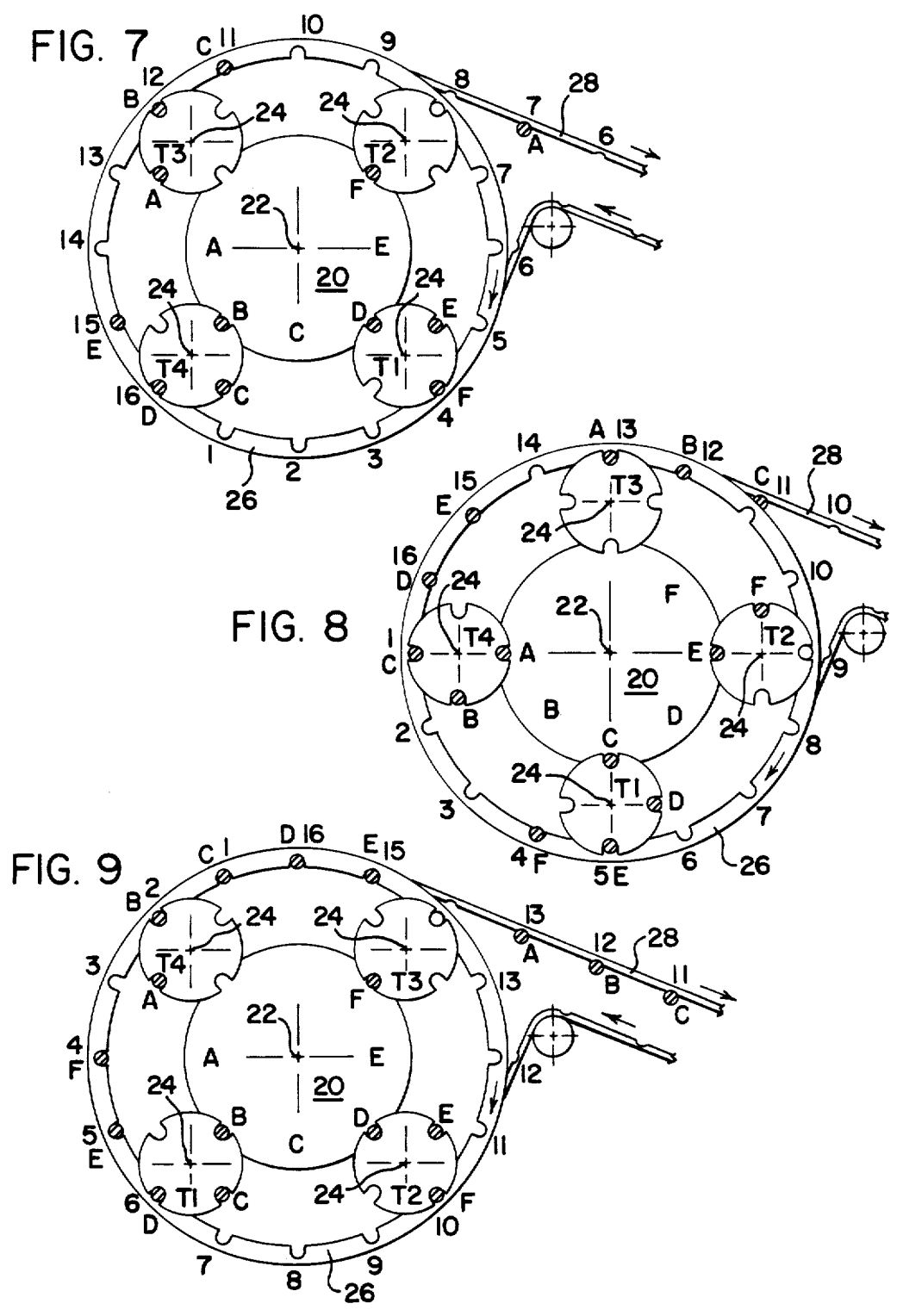

As will be seen in FIG. 8, clockwise rotation of carrier ring 26 67.5° from the position shown in FIG. 7 provides for transfer plates T3, T4 and T1 to be positioned to discharge workpieces A, C and E into carrier ring pockets 13, 1 and 5, respectively, to position transfer plates T4, T1 and T2 for pockets thereof to receive workpieces from supply stations A, C and E, respectively, and to provide for workpieces B, D and F on transfer plates T4, T1 and T2 to be in transport toward the carrier ring. At this time, it will be appreciated from FIGS. 7 and 8, the pockets of transport belt 28 corresponding to carrier ring pockets 11 and 12 have received workpieces C and B, respectively, the belt pockets ahead of the pocket holding workpiece C being empty pockets corresponding to carrier ring pockets 10 and 9 as mentioned above. Rotation of carrier ring 26 another 67.5° clockwise positions the transfer plates as shown in FIG. 9, whereby workpieces B, D and F on transfer plates T4, T1 and T2 are positioned for discharge into carrier ring pockets 2, 6 and 10, respectively, transfer plates T1, T2 and T3 have pockets positioned to receive workpieces from supply stations B, D and F, respectively, and workpieces A, C and E on transfer plates T4, T1 and T2 are in transport toward the carrier ring. At this time, the pockets of transport belt 28 corresponding to carrier ring pockets 12, 13 and 15 in FIG. 8 have received workpieces B, A and E from the latter pockets and are transporting the workpieces away from the apparatus, while the pocket of the transport belt corresponding to carrier ring pocket 14 is empty in that there has been no transfer of workpieces to the latter pocket in the preceding carrier ring displacements. From this point on, however, the machine is in full operation and each of the pockets of the transport belt will thereafter contain a workpiece as the belt travels away from the apparatus. In connection with the completion of the cycle as shown by the displacements of the carrier ring and transfer plates in FIGS. 10, 11 and 12 to position the transfer plates in the positions thereof illustrated in FIG. 4 it is believed that the workpiece pick up, transfer and discharge functions will be obvious from the preceding description. As will be appreciated from FIG. 12, when the transfer plates have completed one cycle of orbit about central axis 22 of the apparatus the carrier ring is rotated through 1.5 revolutions about axis 22, whereby two cycles of orbit of the transfer plates and thus three revolutions of the carrier ring are necessary to displace both the transfer plates and the carrier ring back to the positions thereof shown in FIG. 4. As will be further appreciated from FIGS. 4-12 and the foregoing description thereof, each complete revolution of carrier ring 26 when the apparatus is in full operation provides for the discharge of sixteen workpieces into the transport belt for displacement away from the apparatus. Therefore, for example, an output of 1,200 pieces per minute can be achieved by driving the ring gear and thus the carrier ring at a speed of seventy-five revolutions per minute. Accordingly, it will be appreciated that an extremely high parts per minute output is obtained in a very compact and efficient manner by apparatus according to the invention.

While considerable emphasis has been placed herein on the structure and structural interrelationship between the component parts of the embodiment illustrated and described, it will be appreciated that many embodiments of the invention can be made as well as changes in the disclosed embodiment without departing from the principles of the invention. In particular in this respect, it will be appreciated that the number of workpiece supply stations, transfer plates and/or the number of pockets in the transfer plates and the gear ratios can be modified so long as such modifications enable establishing workpiece pick up and discharge points coincident with the gear teeth contact points between the planet gears and sun gears and between the planet gears and ring gears. These and other modifications of the present embodiment as well as other embodiments of the invention will be suggested or obvious to those skilled in the art upon reading the foregoing description, whereby it is to be distinctly understood that the foregoing descriptive matter is to be interpreted merely as illustrative of the present invention and not as a limitation.

Having thus described the invention, it is claimed:

1. Workpiece conveying apparatus comprising workpiece supply means spaced radially outwardly from and fixed relative to a first axis, a plurality of workpiece transfer means radially outwardly of said supply means and each rotatable about said first axis and about a corresponding second axis parallel to said first axis, said workpiece transfer means being spaced apart from one another about said first axis, each said transfer means including means operable during rotation thereof about said first and second axes to receive a workpiece from said supply means and to transfer said workpiece to a discharge position radially outwardly of said supply means and said second axes, workpiece carrier means displaceable relative to said transfer means and including means to receive said workpiece from said transfer means at said discharge position, and means to displace said carrier means and rotate said transfer means about said first and second axes.

2. Workpiece conveying apparatus according to claim 1, wherein said carrier means is concentric with and rotatable about said first axis.

3. Workpiece conveying apparatus according to claim 1, wherein said supply means includes a plurality of supply stations spaced apart about said first axis.

4. Workpiece conveying appartaus according to claim 1, wherein said carrier means is rotatable about said first axis and said means to displace said carrier means and rotate said transfer means includes gear means for rotating said transfer means about said first and second axes in response to rotatoin of said carrier means about said first axis.

5. Workpiece conveying apparatus according to claim 4, wherein said gear means rotates said transfer means about said second axis at a greater speed than said carrier means rotates about said first axis.

6. Workpiece conveying apparatus comprising workpiece supply means and workpiece carrier means concentric with respect to a first axis, said carrier means being spaced radially outwardly from said supply means and rotatable about said first axis, a plurality of workpiece transfer means radially between said supply and carrier means and spaced apart from one another about said first axis, each said transfer means being rotatable about said first axis and about a second axis parallel to said first axis, each said transfer means including means to receive a workpiece from said supply means and to transfer said workpiece along a path about said second axis to said carrier means during rotation of said carrier means and transfer means about said first and second axes, said carrier means including means to receive said workpiece from said transfer means, and means to rotate said carrier means about said first axis and said transfer means about said first and second axes.

7. Workpiece conveying apparatus according to claim 6, wherein said path is an involute curve between said supply means and said carrier means.

8. Workpiece conveying apparatus according to claim 6, wherein said workpiece supply means includes a plurality of workpiece supply stations spaced apart about said first axis.

9. Workpiece conveying apparatus according to claim 6, wherein said means to rotate said carrier means and transfer means includes a sun gear and a ring gear concentric with said first axis and planet gear means therebetween, said ring gear supporting said carrier means and said planet gear means supporting said transfer means, and means to rotate said ring gear.

10. Workpiece conveying apparatus according to claim 6, wherein said means to rotate said carrier means and transfer means includes means to rotate said carrier means about said first axis at a first speed and means to rotate said transfer means about said second axis at a second speed greater than said first speed.

11. Workpiece conveying apparatus according to claim 10, wherein said workpiece supply means includes a plurality of workpiece supply stations spaced apart about said first axis.

12. Workpiece conveying apparatus according to claim 11, wherein said means to rotate said carrier means and transfer means includes a sun gear and a ring gear concentric with said first axis and planet gear means therebetween, said ring gear supporting said carrier means and said planet gear means supporting said transfer means, and means to rotate said ring gear.

13. Apparatus for conveying workpieces comprising support means having a first axis, a plurality of workpiece supply stations circumferentially spaced apart with respect to said first axis, a plurality of workpiece transfer members radially outwardly of said supply stations and circumferentially spaced apart relative to said first axis, means supporting said transfer members for rotation about said first axis and for rotation about corresponding second axes parallel to said first axis, said transfer members each including pick up means spaced from the corresponding second axis to pick up workpieces at said supply stations in response to rotation of said transfer members about said first and second axes and to displace said workpieces to discharge positions spaced radially outwardly of said second axes, workpiece carrier means displaceable relative to said discharge positions and including receiver means to receive said workpieces from said transfer members, and means to displace said carrier means and rotate said transfer members about said first and second axes.

14. Apparatus according to claim 13, wherein said carrier means includes annular member means concentric with said first axis and including a plurality of said receiver means spaced apart thereabout.

15. Apparatus according to claim 13, wherein each of said transfer members includes at least two pick up means equally spaced radially and circumferentially with respect to the corresponding second axis.

16. Apparatus according to claim 13, wherein said means to rotate said transfer members about said first and second axes includes a sun gear coaxial with said first axis, a planet gear drivingly associated with each transfer member, and means to relatively rotate said sun and planet gears.

17. Apparatus according to claim 6, wherein said means to relatively rotate said sun and planet gears includes a ring gear coaxial with said first axis and means to rotate said ring gear.

18. Apparatus according to claim 17, wherein said carrier means is driven by said ring gear.

19. Apparatus according to claim 18, wherein said carrier means includes annular member means concentric with said first axis and including a plurality of said receiver means spaced apart thereabout.

20. Apparatus according to claim 19, wherein the ratio of rotation of said ring gear to said planet gears about said first axis is 3:2.

21. Apparatus according to claim 19, wherein said planet gears and ring gear have a ratio of 4:1.

22. Apparatus according to claim 19, wherein said plurality of transfer members is provided by four transfer members equally spaced apart about said first axis.

23. Apparatus according to claim 22, wherein each said transfer member has four pick up means equally spaced apart about the corresponding second axis.

24. Apparatus according to claim 23, wherein said plurality of supply stations is provided by six supply stations circumferentially spaced apart 45° from one another about said first axis.

25. Apparatus according to claim 24, wherein the ratio of rotation of said ring gear to said planet gears about said first axis is 3:2.

* * * * *